(12) United States Patent
Huygens et al.

(10) Patent No.: US 6,417,241 B1
(45) Date of Patent: Jul. 9, 2002

(54) PROCESS FOR PREPARING A FLEXIBLE POLYURETHANE FOAM

(75) Inventors: Eric Huygens, Heverlee; Herman Eugene Germain Moureau, Tienen; Jianming Yu, Brussels, all of (BE)

(73) Assignee: Huntsman ICI Chemicals LLC, Wilmington, DE (US)

(*) Notice: Subject to any disclaimer, the term of this patent is extended or adjusted under 35 U.S.C. 154(b) by 0 days.

(21) Appl. No.: 09/369,301

(22) Filed: Aug. 6, 1999

(30) Foreign Application Priority Data

Aug. 7, 1998 (EP) .............................. 98202675

(51) Int. Cl.$^7$ .............................. C08J 9/08; C08J 9/12; C08L 75/08; C08G 18/48; C08G 18/76
(52) U.S. Cl. .................. 521/137; 521/130; 521/133; 521/160; 521/174; 521/904
(58) Field of Search ................................ 521/130, 133, 521/160, 174, 137, 904

(56) References Cited

U.S. PATENT DOCUMENTS

| 4,256,849 A | 3/1981 | Ick et al. ................... 521/129 |
| 4,833,176 A | 5/1989 | Wolf et al. ................. 521/160 |
| 5,258,417 A | 11/1993 | Narayan ..................... 521/160 |
| 5,292,778 A | 3/1994 | Van Veen et al. ........... 521/126 |
| 5,369,138 A | 11/1994 | Gansen ....................... 521/159 |
| 5,521,226 A | 5/1996 | Bleys ......................... 521/174 |
| 5,530,085 A | 6/1996 | Giorgini ..................... 528/59 |
| 5,726,240 A | 3/1998 | Rosthauser ................. 524/590 |

FOREIGN PATENT DOCUMENTS

| CA | 2026033 | 4/1991 |
| GB | 1422056 | 1/1976 |
| GB | 1479658 | 7/1977 |
| WO | 95/09886 | 4/1995 |

OTHER PUBLICATIONS

Derwent Abstract, Record No. 74–85634V., 1998.
Derwent Abstract, Record No. 93–260028, 1998.
Derwent Abstract, Record No. 95–076318, 1998.
Derwent Abstract, Record No. 89–000943, 1998.
Derwent Abstract, Record No. 78–78538A, 1998.
Derwent Abstract, Record No. 94–012375, 1998.
Derwent Abstract, Record No. 91–129164, 1998.
Derwent Abstract, Record No. 93–359780, 1998.
Derwent Abstract, Record No. 91–111036, 1998.
Derwent Abstract, Record No. 98–192813, 1998.
Derwent Abstract, Record No. 93–397398, 1998.
Derwent Abstract, Record No. 98–059247, 1998.
Derwent Abstract, Record No. 94–182663, 1998.
Derwent Abstract, Record No. 94–182662, 1998.
Derwent Abstract, Record No. 94–152136, 1998.
Derwent Abstract, Record No. 93–385750, 1998.
Derwent Abstract, Record No. 93–339801, 1998.
Derwent Abstract, Record No. 92–066304, 1998.
Derwent Abstract, Record No. 91–172772, 1998.
Derwent Abstract, Record No. 89–001888, 1998.
Derwent Abstract, Record No. 87–008470, 1998.
Derwent Abstract, Record No. 84–121673, 1998.
Derwent Abstract, Record No. 83–808819, 1998.
Derwent Abstract, Record No. 81–06131D, 1998.
Derwent Abstract, Record No. 78–84057A, 1998.
Derwent Abstract, Record No. 78–67062A, 1998.
Derwent Abstract, Record No. 78–59069A, 1998.
Derwent Abstract, Record No. 77–84849Y, 1998.
Derwent Abstract, Record No. 77–84685Y, 1998.
Derwent Abstract, Record No. 77–28556X, 1998.

*Primary Examiner*—Rabon Sergent
(74) *Attorney, Agent, or Firm*—Pillsbury Winthrop LLP

(57) ABSTRACT

Process for making molded flexible polyurethane foams MDI-based foams with high resilience using MDI and a polyol composition.

15 Claims, No Drawings

PROCESS FOR PREPARING A FLEXIBLE POLYURETHANE FOAM

The present invention is concerned with a process for preparing flexible polyurethane foams.

It is widely known to prepare flexible polyurethane foams by reacting an organic polyisocyanate and a high molecular weight isocyanate-reactive compound in the presence of a blowing agent. More in particular it has been disclosed in EP 111121 to prepare flexible polyurethane foams from a polyisocyanate composition comprising a semi-prepolymer. The polyisocyanate composition is prepared by reacting a diphenylmethane diisocyanate and a polyol; a polymethylene polyphenylene polyisocyanate (polymeric MDI) is used as well. In EP 392788 flexible foams are prepared by reacting semi-prepolymers or prepolymers with an isocyanate-reactive composition containing a high amount of water. In EP 296449 flexible foams are prepared by reacting polyisocyanates, polyols and water at a relatively low NCO-index.

Copending application PCT/EP95/02068 is concerned with a process for making flexible foams using a semi-prepolymer which has been made by reacting a portion of polymeric MDI with a polyol and adding the other part to the reaction product so obtained.

Although useful flexible foams based on MDI and polymeric MDI and polymeric MDI are obtainable, room for improvement exists. In particular foams made in a closed mould which foams are to be used as cushioning material in automotive seating could be improved as to foam strength, resilience (ball rebound) particularly at low density of the foam.

In the past some of these improvements have been obtained by using tolylene diisocyanate (TDI) instead of MDI. In particular such foams show a high resilience, good foam strength at low density. However, due to its vapour pressure and toxicity special measures need to be taken to handle TDI. Further TDI based foams show relatively poor hardness especially at low density and a slow cure and narrow processing range (isocyanate index).

More recently, proposals have been made to avoid the disadvantages of both MDI-based and TDI-based foams by using combinations of MDI and TDI.

In EP 439792 the use of a polyisocyanate has been proposed which comprises 21–95% by weight of TDI in order to improve the tensile strength; the amount of TDI used still is relatively high.

In EP 679671 the use of a mixture of polymeric MDI and TDI comprising 3–20% by weight of TDI has been proposed to prepare a low density foam having an enhanced impact resilience, improved compression set and an excellent ability to reduce 6 Hz vibration transmissibility. The polymeric MDI used has a high three benzene ring compound content compared to the four or more benzene ring compound content + less active ingredient. The use of polymer polyols has been proposed in very general terms.

In EP 694570 the use of a polyisocyanate prepolymer has been proposed comprising MDI, polymeric MDI and 5–15% by weight of TDI. The polyisocyanate prepolymer has improved flowability; the foams made thereof show improved ILD, compression set and flammability characteristics. The use of a graft polymer dispersion in a polyol has been proposed as well.

In WO 97/19971 it has been proposed to use an MDI prepolymer and TDI to improve resilience and foam stability, comfort properties and mechanical strength. The amount of TDI may be 2–25% by weight of the polyisocyanate composition, which has an MDI+TDI functionality of 2.05–2.35. The use of polymer polyol prepared by the in situ polymerisation of styrene and/or acrylonitrile in polymeric polyols or by the in situ reaction between a polyisocyanate and triethanolamine in a polymeric polyol (PIPA polyol) has been proposed in general terms. The polymeric polyol may contain 5–50% by weight of dispersed polymer. In co-pending application PCT/EP98/0867 it has been proposed to lower the level of TDI and PIPA polyol.

EP 555721 discloses a process for preparing cold-cure, moulded flexible foam by reacting a polyisocyanate of the MDI-type in a one-shot process with a polyol composition comprising 5–30% of a polyol having at least 50% by weight of oxyethylene groups and an OH value of less than 150. The foams show a high resilience (about 65%) only at elevated density (at least about 55%).

However, there remains room for improvement. In particular there is a need for further reduction of the density, while maintaining or even improving other physical properties, like elongation, tear strength, dry compression set and hysteresis loss, of moulded foams which have been made according to the one-shot process using water as the sole blowing agent and MDI-type polyisocyanate as the polyisocyanate.

Also, foams made in a closed mould, which foams are to be used as cushioning material in automotive seating, could be improved as to resilience at low density, especially in the case of TDI-free MDI based foams.

Surprisingly, it has been found that this may be achieved by the process according to the present invention.

The present invention is concerned with a process for preparing a flexible polyurethane foam at an NCO index of 70–120 by reacting in a closed mould a) a polyisocyanate composition consisting of diphenylmethane diisocyanate and homologues thereof having an isocyanate functionality of 3 or more, the amount of diphenylmethane diisocyanate being 81 to 100% by weight calculated on the amount of diphenylmethane diisocyanates and homologues, and the diphenylmethane diisocyanate comprising 40–60% by weight, calculated on the weight of this diphenylmethane diisocyanate, of diphenylmethane diisocyanate containing at least one NCO group in the ortho position, and the amount of homologues having an isocyanate functionality of 3 or more being 19–0% by weight, and b) a polyol composition comprising 1) a polyoxyethylene-polyoxypropylene-polyol, having an average nominal hydroxyl functionality of 2–6, an average equivalent weight of 1000–4000 and containing 10–25% by weight of oxyethylene groups;

2) 4 to 8 parts by weight of water as the sole blowing agent or optionally together with $C_{O2}$ as the sole blowing agents; and 3) 2 to 20, preferably 2 to 10 parts by weight of a polyether polyol having an average nominal hydroxyl functionality of 2–6, an average equivalent weight of 200–600 and containing at least 60% by weight of oxyethylene groups; and optionally 4) up to 30 and preferably 4–25 parts by weight of particulate material which is dispersed in said polyol composition; the amounts of b2) to b4) being calculated per 100 parts by weight of b1); and 5) optionally auxiliaries and additives known per se.

In the context of the present application the following terms have the following meaning:

1) isocyanate index or NCO index or index:
   the ratio of NCO-groups over isocyanate-reactive hydrogen atoms present in a formulation, given as a percentage:

$[NCO] \times 100 / (\%)$

[active hydrogen]

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce the semi-prepolymer or other modified polyisocyanates or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.
2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen and one water molecule is considered to comprise two active hydrogens.
3) Reaction system: a combination of components wherein the polyisocyanate component is kept in a container separate from the isocyanate-reactive components.
4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).
5) The term "average nominal hydroxyl functionality" is used herein to indicate the number average functionality (number of hydroxyl groups per molecule) of the polyol composition on the assumption that this is the number average functionality (number of activehydrogen atoms per molecule) of the initiator(s) used in their preparation although in practice it will often be somewhat less because of some terminal unsaturation. The term "equivalent weight" refers to the molecular weight per isocyanate reactive hydrogen atom in the molecule.
6) The word "average" refers to number average.
7) The wording "one shot", "prepolymer" or "quasi-prepolymer" refer to commonly known ways of reacting the ingredients to prepare the foam wherein all polyol b1is reacted with polyisocyanate in the presence of water; or where a pre-reaction between this polyol and the polyisocyanate takes place, to a greater or lesser extent.

The diphenylmethane diisocyanate (MDI) used may be selected from isomeric mixtures of 4,4'-MDI and 2,4'-MDI and less than 10% by weight of 2,2'-MDI having the aforementioned amount of 40–60% by weight of 2,4'-MDI and 2,2'-MDI.

The homologues having an isocyanate functionality of 3 or more are contained in so-called polymeric or crude MDI.

Polymeric or crude MDI comprise MDI and homologues having an isocyanate functionality of 3 or more and are well known in the art. They are made by the phosgenation of a mixture of polyamines obtained by the acid condensation of aniline and formaldehyde. The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.3–2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation.

The polyisocyanate compositions used in the process according to the present invention and which contain homologues are made by mixing an appropriate amount of MDI and polymeric or crude MDI. For example such polyisocyanates may be made by mixing Suprasec MI 50, containing about 50% by weight of 4,4'-MDI and about 50% w of 2,4'-MDI and 2,2'-MDI and Suprasec 2185, a polymeric MDI having an NCO value of 30.7% by weight; comprising about 38% by weight of diisocyanate, the remainder being homologues having an isocyanate functionality of 3 or more; 6% of the diisocyanates being 2,4'- and 2,2'-MDI. Per 100 parts of polyisocyanate composition the amount of Suprasec MI 50 would be about 70–100 parts and preferably 76–92 parts and the amount of Suprasec 2185 would be about 30–0 parts and preferably 24–8 parts. It is to be noted that the polymeric or crude MDI may contain 2,4'-MDI and 2,2'-MDI and that the range of ortho NCO substituted MDI in the diphenylmethane diisocyanate in polyisocyanate composition a) is the totality of the 2,2'- and 2,4'-MDI in the MDI and in the polymeric or crude MDI.

The functionality is preferably below 2.15. Also, the ortho content is preferably above 45%. No other polyisocyanates are used in the process according to the present invention.

The total amount of polymeric or crude MDI used to prepare the polyisocyanate composition should be such that the amount of diphenylmethane diisocyanate and the amount of ortho-substituted diisocyanate remains within the ranges given above. Those skilled in the art will be able to calculate the amount easily depending on the chosen MDI and the polymeric or crude MDI, certainly in the light of the examples and in view of the above explanation.

The polyisocyanate composition a) is made by simple mixing of the MDI and the crude or polymeric MDI in any order.

Polyether polyols b1) which may be used include products obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, cyclohexane diamine, cyclohexane dimethanol, glycerol, trimethylolpropane and 1,2,6-hexanetriol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups in particular those having at least part and preferably all of the oxyethylene groups at the end of the polymer chain (capped or tipped). Mixtures of the said polyols can be particularly useful.

Most preferred are polyoxyethylene polyoxypropylene polyols having an average nominal functionality of 2–4 and most preferably of 3 and an oxyethylene content of 10–25% by weight, preferably having the oxyethylene groups at the end of the polymer chains.

During the last years several methods have been described to prepare polyether polyols having a low level of unsaturation. These developments have made it possible to use polyether polyols at the higher end of the molecular weight range since much polyols can now be prepared with an acceptably low level of unsaturation. According to the present invention polyols having a low level of unsaturation may be used as well. In particular such high molecular weight polyols having a low level of unsaturation may be used for preparing flexible foams having a high ball rebound.

Water is used as sole blowing agent or together with $CO_2$. The $CO_2$ may be added in the gaseous, the liquid or the supercritical state to the polyisocyanate composition or the polyol composition or to the mixing head or mixing device where these compositions are mixed. The amount of $CO_2$ is such so as to obtain foams having the density as described hereinafter.

The polyols b3) used in polyol composition b) may be selected from the polyether polyol mentioned for 1) with the proviso that the equivalent weight is 200–500 and the oxyethylene content is at least 60% by weight. Most preferred polyols are polyoxyethylene polyols having an equivalent weight of 200–500, especially 200–350.

The particule material is any material present as a dispersion in the polyol. This material is usually a polymeric material; the polyol is a polymer-modified polyol. Various embodiments are known; for example SAN-modified polyols can be used. Preferably the polymer-modified polyol is a polyisocyanate polyaddition (PIPA) polyol.

Preferably, the particulate material b4) is the reaction product of a compound having a plurality of hydroxyl-, primary amine- and/or secondary amine groups and having an equivalent weight of up to 400 and preferably of up to 200 (hereinafter called coreactant) and a polyisocyanate and which is dispersed in a polyol is generally known as such in the art, like e.g. a PIPA polyol. Such PIPA polyols have been described in the prior art extensively: see e.g. GB 2072204, U.S. Pat. No. 4,452,923, EP 418039 and WO 94/12533. Such PIPA polyols are commercially available : e.g. Daltocel XF 417 or 517 from Imperial Chemical Industries PLC, Daltocel is a trademark of ICI. The particulate material which is the reaction product of a polyisocyanate and the coreactant may be prepared in ways described in the above prior art. The content of particulate materials may vary within the disclosed ranges.

Usually the particulate material is prepared in polyol 1) by adding the coreactant to polyol b1) followed by the addition of the polyisocyanate. The amount of coreactant and polyisocyanate depends on the desired amount of particulate material dispersed in the polyol. If desired, loadings of the dispersed material higher than those specified hereinbefore may be made followed by dilution with polyol 1) to the desired amount. When desired, special addition schemes of the coreactant and the polyisocyanate may be employed as disclosed in EP 418039 and WO 94/125333. The relative amount of coreactant and polyisocyanate is generally chosen in such a way that the number of hydrogen atoms in the coreactant capable of reacting with the polyisocyanate exceeds the number of isocyanate groups.

The polyisocyanate used in making the particulate material is any organic compound having at leat two, preferably 2 to 4 isocyanate groups per molecule. The polyisocyanate may be aliphatic, aromatic or cycloaliphatic, although aromatic types are preferred due to their desirable properties and reactivity. Representative of these types are diisocyanates such as m- or p-phenyl diisocyanate, toluene-2,4-diisocyanate, toluene-2,6-diisocyanate, hexamethylene-1,6-diisocyanate, tetramethylene-1,4-diisocyanate, cyclohexane-1,4, diisocyanate, hexahydrotoluene diisocyanate (and isomers), naphtylene-1,5,-diisocyanate, 1-methylphenyl-2,4-phenyldiisocyanate, diphenylmethane-4,4'-diisocyanate, di-phenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and tetraisocyanates such as 4,4'-dimethyldiphenylmethane-2,2', 5,5'-tetraisocyanate, and other polyisocyantes such as the diverse polymethylene-polyphenylpolyisocyanates (polymeric or crude MDI).

The coreactant is a material having a plurality of —OH, >NH and/or —$NH_2$ groups and an equivalent weight per active hydrogen atom of up to 400, preferably up to 200. Since the coreactant reacts with the polyisocyanate in situ in the polyol, it is also preferred that the coreactant be more reactive with the polyisocyanate than the polyol. Preferred coreactants are alkanolamines, low equivalent weight amine-initiated polyether polyols, alkylene oxide, acrylonitrile, or acrylic ester adducts of amines, primary amines, secondary amines, hydrazines, dihydrazides, urea, ammonia, Mannich condensates, low equivalent weight hydroxyl-terminated compounds such as ethylene glycol, glycerine, glycol ethers, pentaerythritol, aminobenzenes, or mixtures thereof. Of these, the alkanolamines are most preferred. Suitable alkanolamines include mon-, di- and trialkanolamines, particularly those wherein the alkanol groups have from 2 to 6, preferably 2 to 3 carbon atoms. The mono- and dialkanolamines may also have a single N-alkyl substituent, preferably having from 1 to 6 carbon atoms. Preferred among these are monethanolamine, diethanolamine, triethanolamine, N-methylethanolamine, N-ethylethanolamine, N-butyl-ethanolamine, N-methyldiethanolamine, diisopropanolamine, triisopropanolamine, N-methylisopropanolamine, N-ethylisopropanolamine, and N-propylisopropanolamine.

Suitable primary and/or secondary amines include polyhydric aliphatic, arylaliphatic, cycloaliphatic and aromatic amines including, for example, ethylene diamine, 1,2- and 1,3-propylene diamine, tetramethylene diamine, hexamethylene diamine, dodecamethylene diamine, trimethyldiaminohexane, N,N'-dimethylethylenediamine, higher homologues of ethylene diamine such as diethylene triamine, triethylenetetramine and tetraethylenepentamine, homologues of propylene diamine, 4-aminobenzylamine, 4-aminophenylethylamine, piperazine, N,N'-bisaminoethyldipropylene triamine, and 1-amino-3,3,5-trimethyl-5-aminomethylcyclohexane.

Suitable hydrazines include hydrazine itself and mono-substituted or N,N'-disubstitued hydrazines having substituent groups such as $C_1$–$C_6$ alkyl, cyclohexyl or phenyl groups. Hydrazine itself is preferred among these.

Suitable hydrazides include the hydrazides of multifunctionalcarboxylic acids such as carbonic acid, oxalic acid, malonic acid, succinic acid, adipic acid, sebacic acid, azelaic acid, maleic acid, fumaric acid, phthalic acid, isophthalic acid and terephthalic acid, and the esters of a hydrazine monocarboxylic acid with dihydric or polyhydric alcohols and phenols. These hydrazides preferably have a molecular weight of from 90 to 1000. The reactants are advantageously mixed at any temperature at which the mixture is a liquid and at which the reactants do not degrade, but are preferably mixed at 0 to 170° C., more preferably 15 to 70° C. The isocyanate and coreactant are advantageously mixed with stirring, in order to promote the formation of a plurality of small particles. Usually, rapid agitation is desired to optimize particle size and minimize the viscosity of the resulting dispersion. The process can be conducted batch-wise or continuously, as described in U.S. Pat. No. 4,374,209.

The reaction between the polyisocyanate and the coreactant is often exothermic, and proceeds rapidly, being essentially completed in most cases in 1 minute to 3 hours, preferably 1 to 30 minutes, although this depends somewhat on the choice of polyisocyanate and coreactant, the batch size and initial temperature. Agitation is preferably effected throughout the reaction period.

If desired, a catalyst for the reaction between the polyisocyanate and the coreactant may be used to accelerate the reaction. Suitable catalysts include these described below with respect to the use of this dispersion to prepare polyurethanes, with the organotin catalysts being preferred. The amount of catalyst is advantageously up to 1 weight percent based on polyol, preferably up to 0.1 weight percent and more preferably up to 0.05 weight percent. However, the catalyst may not be necessary, particularly with the more reactive coreactants.

Once the polyol with the dispersed particulate material has been prepared the polyol composition b) is prepared by adding the water and polyol b3) and mixing. Although not preferred, the constituents of the polyol composition may be led to the mixing device where they are combined with the polyisocyanate independently from each other. It will be appreciated that the PIPA polyol is typically of the same nature of polyol 1); these two polyols may be different or identical. Polyol 1) may thus be a mixture, as will be understood by the skilled man. To this polyol composition b) additives and auxiliaries known per se may be added, like catalysts which enhance the formation of urethane and urea bonds (e.g. tertiary amine and organo tin catalysts), chain extenders and cross-linkers having an equivalent weight of 31 to less than 200 and having 2–8 isocyanate-reactive hydrogen atoms (e.g. ethanolamine, diethanolamine, triethanolamine, ethylene glycol, diethylene glycol, triethylene glycol, propylene glycol, dipropylene glycol, butanediol, glycerol, trimethylolpropane, pentaerythritol, sorbitol, sucrose, polyethylene glycol having a molecular weight less than 400, toluene diamine, diethyl toluene diamine, cyclohexane diamine, phenylene diamine, diphenylmethane diamine, alkylated diphenylmethane diamine and ethylene diamine), surfactants, stabilizers, flame retardants, fillers, anti-oxidants, anti-microbial agents and colorants.

The foams are made by combining and mixing the polyisocyanate and polyol compositions a) and b) and allowing the mixture to react in a closed mould. The relative amounts will depend on the desired index which may vary from 70–120 and can be easily calculated by those skilled in the art from a selected polyisocyanate and polyol composition. A further advantage of the use of the polyisocyanate composition a) and the polyol composition b) is that in order to operate at an index of 70–120 the relative amounts of the compositions do not differ too much, which allows for easy metering and mixing of the compositions.

The process may be used to make moulded foams including using the so-called foam-in-fabric and pour-in-place applications. One-shot, prepolymer or quasi-prepolymer processes can be used.

The flexible foams prepared according to the present invention have a free rise density of 20–50 kg/m$^3$ (ISO 845) especially 35–45 kg/m$^3$ and may be used in mattresses, cushions, furniture seating and automotive seating and especially in automotive seat-backs.

EXAMPLE 1

76.8 parts by weight of Suprasec MI 50 and 23.2 parts by weight pbw of Suprasec 2185 were mixed (functionality is 2.12) and allowed to react at an NCO-index of 74.6 in a closed mould with a polyol composition comprising: 34.8 pbw of Arcol™ 1374 (an EO/PO polyol obtainable from Arco with OHv=28 mg KOH/g, nominal functionality=3, 15% by weight EO (all tipped)), 20 pbw of Daltocel™ XF 417 (a PIPA polyol from ICI containing 20% w of dispersed particulate material); 3 pbw of polyethylene glycol having a molecular weight of 600, 0.2 pbw of dimethylethanolamine, 0.12 pbw of dimethylamino-propylamine, 0.3 pbw of D8154 (a catalyst from Air Products), 0.6 pbw of Tegostab B4113 (silicon surfactant from Goldschmidt), 0.1 pbw of triethanolamine and 3.17 pbw of water. The temperature of the polyisocyanate and the polyol composition was room temperature and the temperature of the mould was 61° C. The amount of overpack was 31%. Demouding took place after 6 minutes.

EXAMPLES 2–9

Example 1 is repeated, but with the following components The isocyanate composition (one shot) comprises 73.2 parts by weight of Suprasec MI50 and 26.8 parts by weight of Suprasec 2185, which are mixed (functionality is 2.14). The other components are identical or similar to the ones used in example 1. The isocyanate prepolymer (20% prepolymer, functionality is 2.14) comprises 11.3 parts by weight of Arcol™ 1374, 64.9 parts by weight of Suprasec MI50 and 23.8 parts by weight of Suprasec 2185, which are mixed in this order. The other components are identical or similar to the ones used in example 1. As far as examples 2–9 are concerned process conditions are identical to those of example 1.

The following table summarizes the relevant technical information, in which the "resin side" means the components added in the separate stream to the isocyanate component. Also, the listed terms have the following meaning: DMAPA stands for dimethylaminopropylamine, DMEA stands for dimethylethanolamine, TELA stands for triethanolamine, DELA stands for diethanolamine and OAD stands for overall density.

|  |  | Examples | | | | | | | | |
|---|---|---|---|---|---|---|---|---|---|---|
|  |  | 1 | 2 | 3 | 4 | 5 | 6 | 7 | 8 | 9 |
| Component |  |  |  |  |  |  |  |  |  |  |
| ISOCYANATE |  |  |  |  |  |  |  |  |  |  |
| Fn = 2.14; 20% prepolymer | % |  | 43.6 | 41.0 |  |  | 45.7 | 43.1 |  |  |
| Fn = 2.14 – one shot | % |  |  |  | 38.6 | 36.2 |  |  | 40.5 | 38.0 |
| Fn = 2.12 – one shot | % | 37.7 |  |  |  |  |  |  |  |  |
| RESIN SIDE |  |  |  |  |  |  |  |  |  |  |
| A1374 | % | 34.8 | 17.8 | 18.7 | 22.7 | 23.7 | 18.3 | 19.25 | 23.5 | 24.45 |
| PEG600 | % | 3 | 5.0 | 5.2 | 5.0 | 5.2 | 4.5 | 4.7 | 4.5 | 4.7 |
| F417 | % | 20 | 30 | 31.3 | 30 | 31.25 | 27.5 | 28.75 | 27.5 | 28.75 |
| DMAPA | % | 0.12 | 0.12 | 0.13 | 0.12 | 0.12 | 0.12 | 0.13 | 0.12 | 0.13 |
| D8154 | % | 0.30 | 0.40 | 0.42 | 0.40 | 0.42 | 0.40 | 0.42 | 0.40 | 0.42 |
| DMEA | % | 0.20 | 0.20 | 0.21 | 0.20 | 0.21 | 0.20 | 0.2 | 0.20 | 0.21 |
| B4113 | % | 0.60 | 0.60 | 0.63 | 0.60 | 0.62 | 0.60 | 0.63 | 0.60 | 0.63 |
| Dela | % |  | 0.00 | 0.00 | 0.00 | 0.00 | 0.20 | 0.21 | 0.20 | 0.21 |
| Tela | % | 0.10 |  |  |  |  |  |  |  |  |
| Water | % | 3.17 | 2.30 | 2.41 | 2.30 | 2.40 | 2.41 | 2.52 | 2.40 | 2.51 |
| NCO index | % | 74.6 | 100 | 90 | 100 | 90 | 100 | 90 | 100 | 90 |
| MOULDING |  |  |  |  |  |  |  |  |  |  |
| OAD (ISO 845) | kg/m$^3$ | 35.2 | 45.1 | 45.3 | 44.3 | 45.7 | 40.2 | 40.3 | 39.9 | 40.4 |
| Indentation hardness ILD 25% (ISO 2439) | kg | 10.1 | 23.6 | 17.6 | 21.0 | 16.9 | 18.3 | 14.8 | 18.6 | 13.7 |
| Resilience (ISO 8307) | % | 59 | 66 | 66 | 64 | 65 | 64 | 65 | 64 | 64 |
| Elongation (ISO 1798) | % | 110 | 80 | 89 | 85 | 91 | 83 | 86 | 73 | 83 |
| Tensile (ISO 1798) | kg/cm$^2$ |  | 1.20 | 1.08 | 1.21 | 1.09 | 1.06 | 0.99 | 0.93 | 0.84 |
| Compression set (dry, 50%) (ISO 1856, method A –70° C.) | % | 7.9 | 4.0 | 4.0 | 4.4 | 3.6 | 4.0 | 4.0 | 4.0 | 3.9 |

The flexible foams show high resilience (high ball rebound) at densities of 40–45 kg/m$^3$. Especially the foams of the invention allow to reach resilience above 65% for a density of 45 kg/m$^3$ and resilience above 60%, preferably above 65%, for a density of 40 kg/m$^3$.

What is claim is:

1. A process for preparing a flexible polyurethane foam at an NCO index of 70–120 by reacting in a closed mould, a) a polyisocyanate composition having a functionality below 2.15 and consisting of diphenylmethane diisocyanate and homologues thereof wherein, the amount of diphenylmethane diisocyanate is 81 to 100% by weight calculated on the amount of diphenylmethane diisocyanate and homologues, said diphenylmethane diisocyanate comprising 40–60% by weight, calculated on the weight of diphenylmethane diisocyanate, of diphenylmethane diisocyanate containing at least one NCO group in the ortho position, and wherein the amount of homologues is 19–0% by weight, said homologues having an isocyanate functionality of 3 or more, and b) a polyol composition comprising:

1) a polyoxyethylene-polyoxypropelene-polyol, having an average nominal hydroxyl functionality of 2–6, an average equivalent weight of 1000–4000 and containing 10–25% by weight of oxyethylene groups;

2) 4 to 8 parts by weight of water as the sole blowing agent or optionally together with $CO_2$ as the sole blowing agents;

3) 2 to 20 parts by weight of a polyether polyol having an average nominal hydroxyl functionality of 2, an average equivalent weight of 200–600 and containing at least 60% by weight of oxyethylene groups; and 4) 4 to 25 parts by weight of particulate material which is dispersed in said polyol composition; the amounts of b2) to b4) being calculated per 100 parts by weight of b1); and 5) optionally auxiliaries and additives;

wherein said particulate material is the reaction product of a polyisocyanate and a compound having a plurality of hydroxyl, primary amine and/or secondary amine groups and an equivalent weight of up to 400.

2. Process according to claim 1 wherein the polyol composition comprises from 11 to 20 parts by weight of particulate material b4).

3. The process according to claim 1 wherein the amount of water is 4.5–7.5 pbw.

4. The process according to claim 1 wherein the polyether polyol 3) is polyethyleneglycol.

5. The process according to claim 1 wherein the average equivalent weight of the polyether polyol b3) is between 200–350.

6. The process according to claim 1 wherein the particulate material is the reaction product of triethanolamine and diphenylmethane diisocyanate optionally comprising homologues thereof having an isocyanate functionality of 3 or more.

7. The process according to claim 1 wherein the amount of diisocyanate is 85–95% by weight and the amount of homologues is 15–5% by weight.

8. The process according to claim 1 wherein the functionality of the polyisocyanate is between 2.08–2.14.

9. The process according to claim 1 wherein the diphenylmethane diisocyanate comprises 45–50% by weight of diphenylmethane diisocyanate containing at least one NCO group in the ortho position.

10. The process according to claim 1, wherein the amount of polyether polyol b3) is 2 to 10 parts by weight.

11. The process according to claim 1, wherein the polyol composition comprises 4–25 parts by weight of particulate material b4) and wherein the amount of polyether polyol b3) is 2 to 10 parts by weight;

the polyether polyol is polyethyleneglycol; and the particulate material is the reaction product of a polyisocyanate and a compound having a plurality of hydroxyl-, primary amine and/or secondary amine groups and having an equivalent weight of up to 400.

12. A polyurethane flexible foam prepared in a closed mold, wherein said foam has a density of 45 kg/m$^3$ or less together with a resilience of 60% or more which foam has been made from the ingredients used in claim 1.

13. The foam of claim 12, wherein said foam has a density of 40 kg/m$^3$ or less.

14. The foam of claim 12, wherein said foam has a resilience of 65% or more.

15. The foam of claim 12, wherein said foam has a density of 40 kg/m$^3$ or less and a resilience of 65% or more.

* * * * *